(12) United States Patent
Komori et al.

(10) Patent No.: US 12,128,834 B2
(45) Date of Patent: Oct. 29, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Hirokazu Komori, Mie (JP); Daichi Ashida, Mie (JP)

(73) Assignees: AutoNetworks Technologies, Ltd., Mie (JP); Sumitomo Wiring Systems, Ltd., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 120 days.

(21) Appl. No.: 17/910,620

(22) PCT Filed: Mar. 9, 2021

(86) PCT No.: PCT/JP2021/009147
§ 371 (c)(1),
(2) Date: Sep. 9, 2022

(87) PCT Pub. No.: WO2021/192993
PCT Pub. Date: Sep. 30, 2021

(65) Prior Publication Data
US 2023/0150442 A1    May 18, 2023

(30) Foreign Application Priority Data
Mar. 27, 2020    (JP) ................................. 2020-057768

(51) Int. Cl.
*B60R 16/02*    (2006.01)
*F16B 5/06*    (2006.01)
(Continued)

(52) U.S. Cl.
CPC ............ *B60R 16/0207* (2013.01); *F16B 5/06* (2013.01); *H02G 3/04* (2013.01); *H02G 3/32* (2013.01)

(58) Field of Classification Search
CPC .......... H02G 3/04; H02G 3/32; H02G 3/0431; H02G 3/0537; H02G 3/0487; B60R 16/2015; F16B 5/06; H01B 7/40
See application file for complete search history.

(56) References Cited

U.S. PATENT DOCUMENTS 6,257,898 B1 * 7/2001 Serizawa ............. H05K 1/0281
                                                        248/74.2
2016/0035463 A1 * 2/2016 Ozaki ................ H01R 43/0207
                                                        156/73.1
(Continued)

FOREIGN PATENT DOCUMENTS

JP     01-107414     4/1989
JP     07-298446     11/1995
(Continued)

OTHER PUBLICATIONS

International Search Report issued in International Patent Application No. PCT/JP2021/009147, dated May 25, 2021, along with an English translation thereof.

*Primary Examiner* — Paresh Paghadal
(74) *Attorney, Agent, or Firm* — Greenblum & Bernstein, P.L.C.

(57) ABSTRACT

A wiring member includes: at least one wiring body including a sheet and a wire-like transmission member fixed to the sheet; and a regulation member including a housing part and a retaining piece and attached to the wiring body. The housing part includes a bottom part and two sidewall parts protruding from the bottom part. The wiring body is housed in the housing part while both end portions along a width direction are bended with respect to an intermediate portion (Continued)

and extend toward a tip end portion of each of the two sidewall parts. The retaining piece protrudes above the housing part from the tip end portion of each of the two sidewall parts to press the end portions of the wiring body.

6 Claims, 6 Drawing Sheets

(51) Int. Cl.
*H02G 3/04* (2006.01)
*H02G 3/32* (2006.01)

(56) References Cited

U.S. PATENT DOCUMENTS

| | | |
|---|---|---|
| 2019/0392963 A1 | 12/2019 | Ishida et al. |
| 2021/0210249 A1 | 7/2021 | Matsuo et al. |

FOREIGN PATENT DOCUMENTS

| | | |
|---|---|---|
| JP | 2519788 | 12/1996 |
| JP | 2005-312177 | 11/2005 |
| JP | 2018-137208 | 8/2018 |
| WO | 2019/225095 | 11/2019 |

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

A regulation member such as a protector is desired to be simply attached to a wire harness.

Accordingly, an object is to provide a technique capable of simply attaching a regulation member to a wiring body.

Means to Solve the Problem

A wiring member according to the present disclosure is a wiring member including: at least one wiring body including a sheet and a wire-like transmission member fixed to the sheet; and a regulation member including a housing part and a retaining piece and attached to the wiring body, wherein the housing part includes a bottom part and two sidewall parts protruding from the bottom part, the wiring body is housed in the housing part while both end portions along a width direction are bended with respect to an intermediate portion and extend toward a tip end portion of each of the two sidewall parts, and the retaining piece protrudes above the housing part from the tip end portion of each of the two sidewall parts to press the end portion of the wiring body.

Effects of the Invention

According to the present disclosure, the regulation member can be simply attached to the wiring body.

DESCRIPTION OF EMBODIMENT(S)

Figure 1:
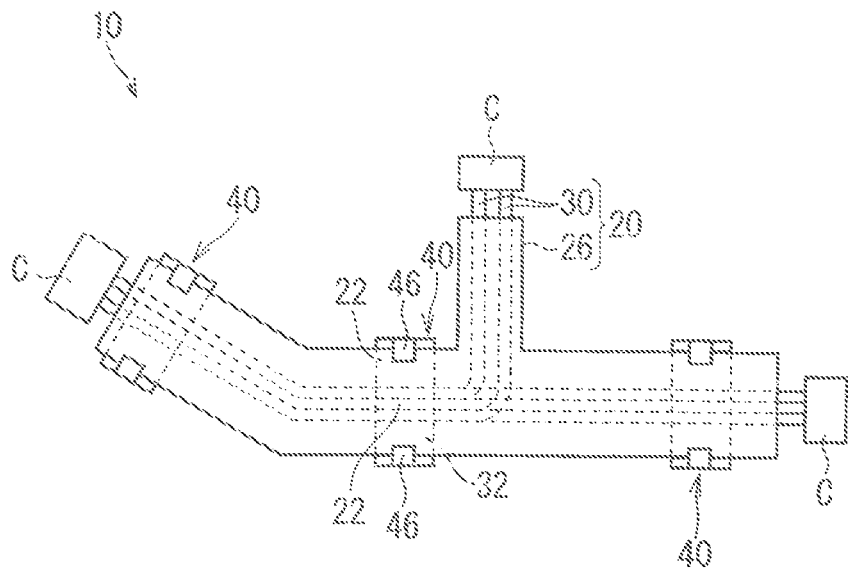
FIG. 1 is a schematic plan view illustrating a wiring member according to an embodiment 1.

[Description of embodiment of present disclosure] Embodiments of the present disclosure are listed and described firstly.

A wiring member according to the present disclosure is as follows.

(1) A wiring member includes: at least one wiring body including a sheet and a wire-like transmission member fixed to the sheet; and a regulation member including a housing part and a retaining piece and attached to the wiring body, wherein the housing part includes a bottom part and two sidewall parts protruding from the bottom part, the wiring body is housed in the housing part while both end portions along a width direction are bended with respect to an intermediate portion and extend toward a tip end portion of each of the two sidewall parts, and the retaining piece protrudes above the housing part from the tip end portion of each of the two sidewall parts to press the end portions of the wiring body. Accordingly, the end portion is housed in the housing part while the wiring body is bended to be locked to the retaining piece, thus the regulation member is simply attached to the wiring body.

(2) In the wiring member according to (1), the wire-like transmission member may be provided only in the intermediate portion in the intermediate portion and the both end portions in the wiring body. Accordingly, bending of the wire-like transmission member is suppressed.

(3) In the wiring member according to (1) or (2), it is also applicable that the plurality of wiring bodies flatly formed are stacked, and the end portions of the plurality of stacked wiring bodies are pressed by the retaining piece. Accordingly, the regulation member is simply attached to a laminated body of the plurality of wiring bodies.

(4) In the wiring member according to (3), it is also applicable that an integrated end portion in which the end portions of the plurality of stacked wiring bodies are integrated is provided, and the retaining piece presses the integrated end portion. The integrated end portion is provided, thus rigidity of the integrated end portion is increased even when rigidity of the end portion of each wiring body is low. Accordingly, a state where the end portions of the wiring bodies are pressed by the retaining piece is hardly resolved.

(5) In the wiring member according any one of (1) to (4), wherein the wire-like transmission member may include a transmission wire body and a covering layer covering the transmission wire body. Accordingly, the regulation member is simply attached to the wiring body in which the wire-like transmission member with the covering layer is fixed to the sheet.

(6) In the wiring member according to any one of (1) to (5), the regulation member may further include a fixing part fixed to a routing target of the wiring body. Accordingly, the regulation member can double as a fixing member.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
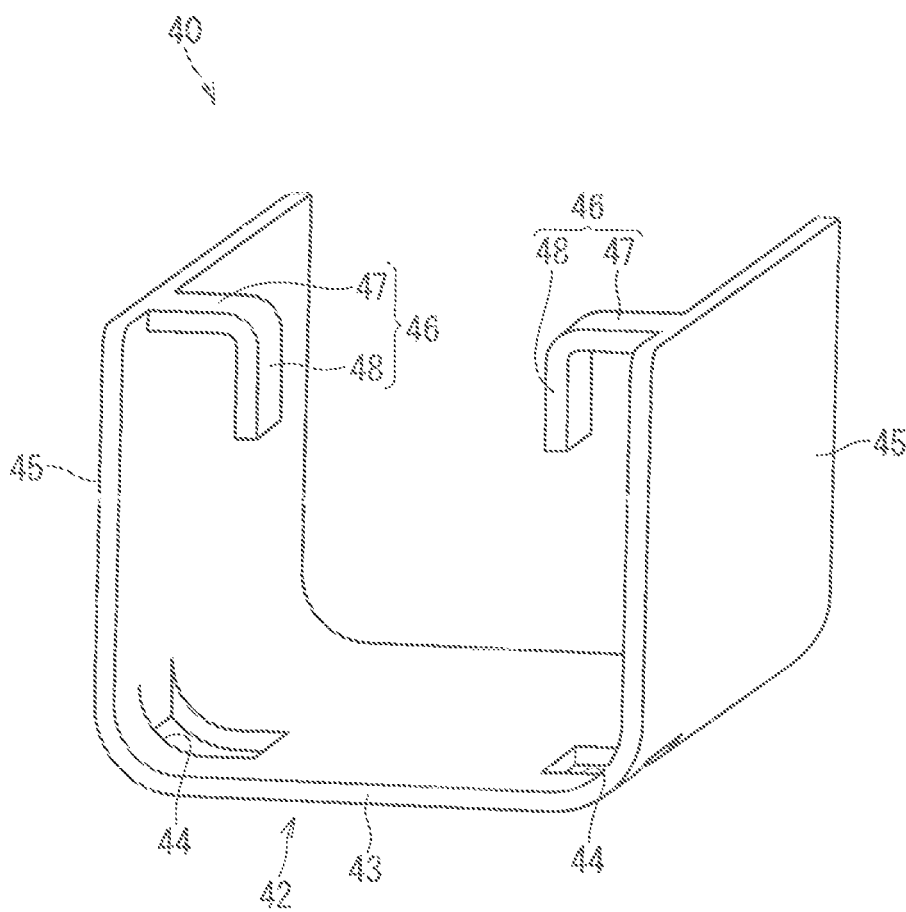
FIG. 2 is a perspective view illustrating a regulation member.
Figure 3:
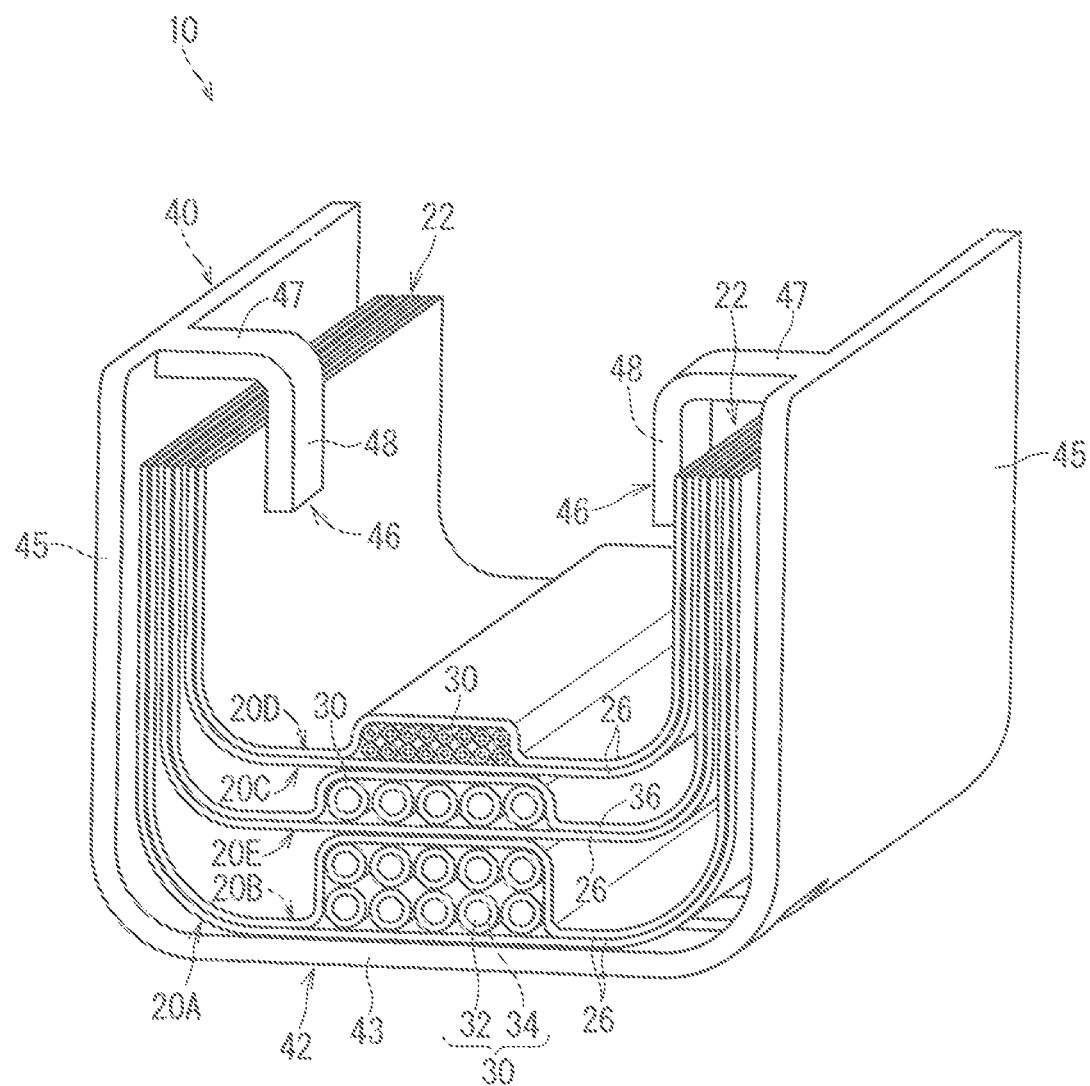
FIG. 3 is a perspective view illustrating a portion of the wiring member to which the regulation member is attached.
Figure 4:
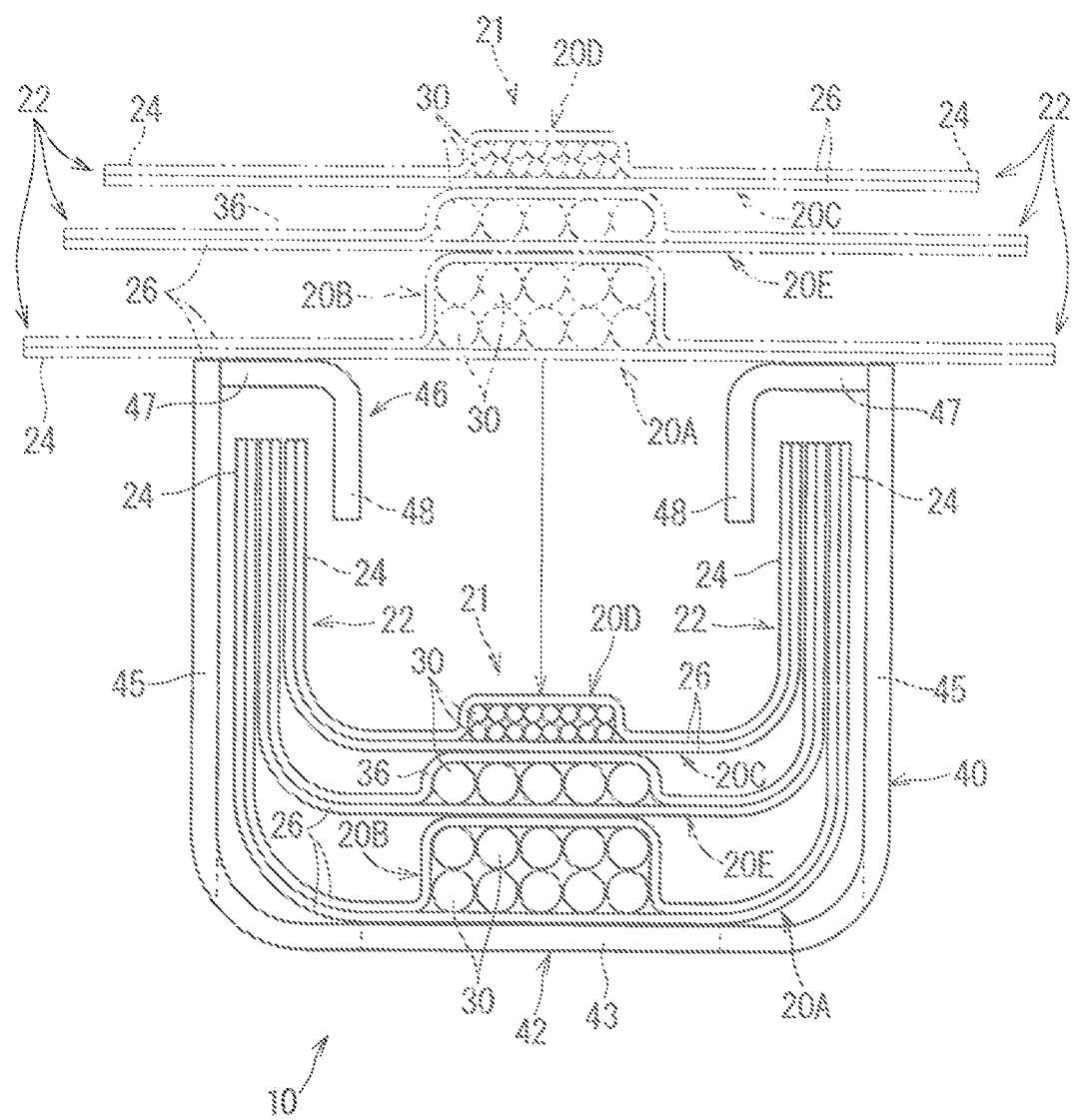
FIG. 4 is a front view illustrating a portion of the wiring member to which the regulation member is attached.

A wiring member according to an embodiment 1 is described hereinafter. FIG. 1 is a schematic plan view illustrating a wiring member 10 according to the embodiment 1. FIG. 2 is a perspective view illustrating a regulation member 40. FIG. 3 is a perspective view illustrating a portion of the wiring member 10 to which the regulation member 40 is attached. FIG. 4 is a front view illustrating a portion of the wiring member 10 to which the regulation member 40 is attached.

The wiring member 10 includes at least one wiring body 20 and at least one regulation member 40. Herein, the wiring member 10 includes the plurality of wiring bodies 20. Herein, the wiring member 10 includes the plurality of regulation members 40.

Wiring Body

Each wiring body 20 is flatly formed. The plurality of wiring bodies 20 are stacked. Each wiring body 20 includes a sheet 26 and at least one wire-like transmission member 30. Herein, each wiring body 20 includes the plurality of wire-like transmission members 30. Each wire-like transmission member 30 is fixed to the sheet 26.

The sheet 26 keeps the plurality of wire-like transmission members 30 in a state of being arranged side by side. The plurality of wire-like transmission members 30 are fixed to the sheet 26. In the description herein, the sheet 26 and the wire-like transmission member 30 are fused to each other. The sheet 26 includes a fusion layer. In the description herein, the sheet 26 has a double layer structure of the fusion layer and an additional layer. The sheet 26 may have a single layer structure, or may also have a three or more layer structure.

The fusion layer includes a resin material, or preferably includes a thermoplastic resin material. The resin material of the fusion layer is softened and fused to a fusion target. A type of the resin material is not particularly limited, but polyvinyl chloride (PVC), polyethylene (PE), polypropylene (PP), or polyethylene terephthalate (PET) can be adopted, for example. One surface of the fusion layer is a surface of the sheet 26 having contact with the wire-like transmission member 30.

A structure of the fusion layer is not particularly limited. For example, the fusion layer may be a sheet having an evenly filled cross-sectional surface (also referred to as a non-foam sheet or a solid sheet, for example). The fusion layer is also considered a foam sheet, for example. The fusion layer is also considered a fibrous material sheet such as a braided cloth, a woven cloth, or a non-woven cloth, for example.

The additional layer is formed of a material different from that of the fusion layer, or has a different structure. The additional layer increases a function of the fusion layer, or adds a function which the fusion layer does not have to the sheet 26. A material constituting the additional layer is a material described for the fusion layer described above or metal, for example. A structure of the additional layer may be any of the structure described for the fusion layer described above. One surface of the additional layer is a surface of the sheet 26 directed to a side opposite to the wire-like transmission member 30.

The fusion layer and the additional layer are fixed to each other while the other surface of the fusion layer and the other surface of the additional layer have contact with each other. A fixing state of the fusion layer and the additional layer is not particularly limited, however, fixing by fusion or adhesion is preferable. For example, when at least one of the fusion layer or the additional layer is a sheet having voids in a surface such as a fibrous material sheet or a foam sheet, a resin material or an adhesive agent enters the voids and the layers can be fixed to each other. Such a configuration causes so-called anchor effect, thus the fusion layer and the additional layer are rigidly fixed.

In the description herein, the fusion layer is a solid sheet formed of resin and the additional layer is a fibrous material sheet. In the description herein, the fusion layer and the additional layer are fused to each other. That is to say, the resin of the fusion layer enters between the fibers of the additional layer while having flowability, and is then hardened. Accordingly, a state where the resin of the fusion layer enters between the fibers of the additional layer is maintained, and the fusion layer and the additional layer are rigidly fixed.

The fusion layer and the additional layer may be formed to have the same size (the same planar shape). One of the fusion layer and the additional layer may also be formed to be larger than the other one thereof. The fusion layer and the additional layer may be wholly fixed at a region where they have contact with each other. The fusion layer and the additional layer may also be fixed only at a part of a region where they have contact with each other.

The sheet 26 may be a flexible member. For example, the fusion layer is a resin layer having an evenly filled cross-sectional surface made up of flexible resin such as flexible PVC as a material, the additional layer is a non-woven cloth made up of PET as a material, and the sheet 26 is a flexible member. The sheet 26 may have a plastic property so as to be able to follow bending of the wire-like transmission member 30. It is also applicable that the wiring member 10 can be bended in a thickness direction (bending so that a fold line follows a main surface of the sheet 26). The sheet 26 may be a member which cannot be curved in the thickness direction. The sheet 26 may be a member which is not broken but can be bended at a time of being bended in the thickness direction.

The plurality of wire-like transmission members 30 are wire-like members transmitting an electrical power or light, for example. For example, the wire-like transmission member 30 may be a general wire having a core wire and a covering around the core wire, or may also be a shielded wire, an electrical cable, an enamel wire, a nichrome wire, or an optical fiber cable.

The wire-like transmission member 30 transmitting the electrical power may be various kinds of signal lines or various kinds of power lines. Some of the wire-like transmission members 30 transmitting the electrical power may be used as an antenna or coil, for example, transmitting or receiving a signal or electrical power to or from a space. The wire-like transmission member 30 may be a single wire-like object or a composite object of a plurality of wire-like objects (a twisted wire and a cable made up of a plurality of wire-like objects covered by a sheath). When the wire-like transmission member 30 is a cable, a sheath is also included in the covering layer 34.

The plurality of wire-like transmission members 30 are assumed to be members connecting components in a vehicle. The sheet 26 keeps the plurality of wire-like transmission members 30 in a state of extending along a predetermined route. As illustrated in FIG. 1, the route of the wire-like transmission member 30 includes a bending portion and a branch portion herein. The bending portion is a portion where the plurality of wire-like transmission members 30 are bended while being in parallel to each other. The branch portion is a portion where some wire-like transmission member 30 is branched to extend in a direction different from the other some wire-like transmission member 30. The plurality of wire-like transmission members 30 may intersect on the sheet 26.

Herein, the sheet 26 is formed into a shape along a route of the wire-like transmission member 30. The sheet 26 includes a portion bended in accordance with a bended route of the wire-like transmission member 30. That is to say, the sheet 26 is also bended in the bended part. The sheet 26 includes a portion branched in accordance with a branched route of the wire-like transmission member 30. That is to say, the sheet 26 is also branched in the branched part.

An end portion of the wire-like transmission member 30 extends from the sheet 26 to be located on an outer side of the sheet 26. An intermediate portion of the wire-like transmission member 30 except for the end portion is disposed on the sheet 26. A connector C, for example, is provided on an end portion of the wire-like transmission member 30. This connector C is connected to a connector provided in the other side component, thus the wire-like transmission member 30 is connected to the other side component. That is to say, the present wiring member 10 is used as the wiring member 10 electrically connecting various types of component in a vehicle, for example (or connecting them so that they can perform optical communication). The end portion of the wire-like transmission member 30 may also be located on the sheet 26. A connector housing of the connector C may be fixed to the sheet 26.

The wire-like transmission member 30 includes a transmission wire body 32 and a covering layer 34. The transmission wire body 32 is a portion transmitting an electrical power or light. The transmission wire body 32 corresponds to a conductor core wire in the electrical wire, and corresponds to a core and a clad in an optical fiber cable. The covering layer 34 covers the transmission wire body 32. The covering layer 34 is formed of a resin material extruded around the transmission wire body 32 to cover it, for example. A type of the resin material is not particularly limited, however, PVC, PE, PP, and PET, for example, can be adopted. The covering layer 34 on an outermost side of the wire-like transmission member 30 is fused to the fusion layer. The covering layer 34 on the outermost side of the wire-like transmission member 30 may be made by the same resin material as that of the fusion layer.

A portion where the sheet 26 and the wire-like transmission member 30 are fused to each other is defined as the fusion part. A means of forming the fusion part is not particularly limited, however, adoptable are various types of fusion means such as ultrasonic fusion, heating pressurizing fusion, hot air fusion, and high-frequency fusion. When the fusion part is formed by these means, the fusion part is in a state of fusion fixation by those means. Specifically, when the fusion part is formed by ultrasonic fusion, the fusion part is an ultrasonic fusion part, for example.

The plurality of fusion parts may be provided at intervals along an extension direction of the wire-like transmission member 30. The fusion part may be continuously provided along the extension direction of the wire-like transmission member 30.

The wire-like transmission member 30 is fixed to an intermediate portion of the sheet 26 along a width direction. The wire-like transmission member 30 is not fixed to both end portions of the sheet 26 along the width direction.

Herein, two wiring bodies 20A and 20B in the five wiring bodies 20 are mutually disposed in opposite directions and integrated with each other. The two wiring bodies 20A and 20B are disposed so that the sheet 26 is located on an outer side in relation to the wire-like transmission member 30. The sheet 26 of the two wiring bodies 20A and 20B covers the wire-like transmission member 30 of the two wiring bodies 20A and 20B. Two wiring bodies 20C and 20D are also mutually disposed in opposite directions and integrated with each other in the manner similar to the two wiring bodies 20A and 20B. Accordingly, end portions 22 of the two wiring bodies 20A and 20B and end portions 22 of the two wiring bodies 20C and 20D constitute an integrated end portion 24. The integrated end portion 24 is provided, thus rigidity of the end portions 22 of the wiring bodies 20A, 20B, 20C, and 20D is increased.

A wiring body 20E is not integrated with the other wiring bodies 20. The wiring body 20E is provided with a cover 36. The cover 36 covers the wire-like transmission member 30. The cover 36 covers the sheet 26 up to the end portion thereof. An end portion of the cover 36 is integrated with the end portion of the sheet 26. Accordingly, rigidity of the end portion 22 of the wiring body 20E is also increased.

The end portions of the two wiring bodies 20A and 20B are integrated by fusing the sheets 26. Accordingly the integrated end portion 24 is provided without using the other member. The end portions 22 of the two wiring bodies 20A and 20B may be integrated by the other member. For example, the end portions 22 of the two wiring bodies 20A and 20B may be integrated by an adhesive member such as an adhesive tape or an adhesive agent. For example, the end portions 22 of the two wiring bodies 20A and 20B may be integrated by a locking member such as a stapler. The same applies to the sheet 26 and the cover 36 in the end portions 22 of the two wiring bodies 20C and 20D and the end portion 22 of the wiring body 20E.

Figure 5:
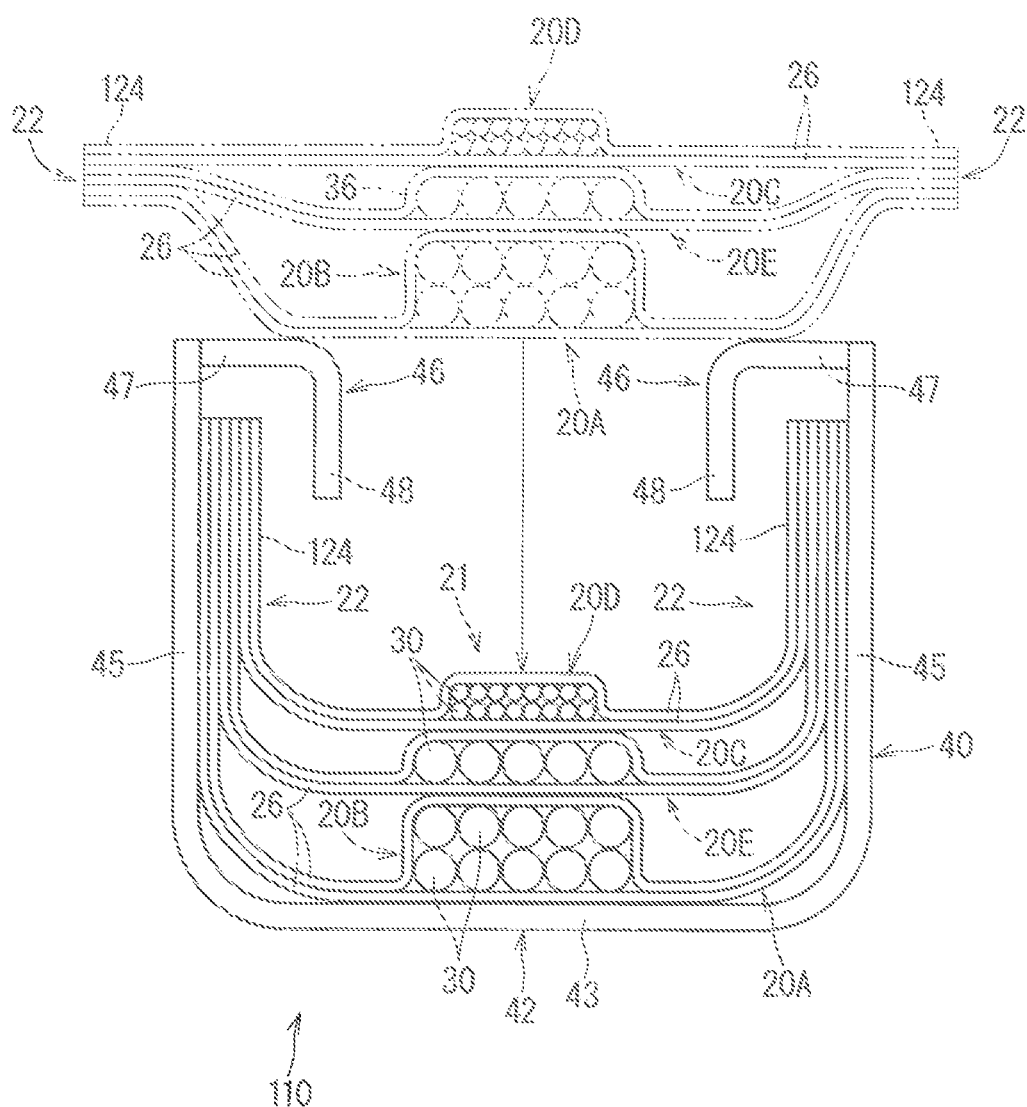
FIG. 5 is a front view illustrating a modification example of a wiring body.

All of the end portions 22 of the plurality of wiring bodies 20 in the wiring member 10 may be integrated with each other. In a wiring member 110 illustrated in FIG. 5, all of the end portions 22 of the plurality of wiring bodies 20A, 20B, 20C, 20D, and 20E are integrated with each other and an integrated end portion 124 is provided in each of the both end portions 22. Accordingly, rigidity of the end portion 22 of the wiring body 20 is further increased.

The plurality of wire-like transmission members 30 are divided into groups made up of the plurality of wiring bodies 20. Any way of division may be applied as a way of dividing the plurality of wire-like transmission members 30 into a plurality of groups.

For example, the plurality of wire-like transmission members 30 are divided into groups for each route. Specifically, when the plurality of wire-like transmission members 30 are branched into a plurality of branch wire parts from a main wire part, it is also applicable that the wire-like transmission member 30 constituting one branch wire part constitutes one wiring body 20 and the wire-like transmission member 30 constituting the other one branch wire part constitutes the other one wiring body 20. Accordingly, the plurality of wiring bodies 20 are stacked after the wiring bodies 20 are manufactured for each route, thereby being able to constitute the wiring member 10 having a branch.

For example, the plurality of wire-like transmission members 30 may be divided into groups for each type of wire. Specifically, the plurality of wire-like transmission members 30 include the wire-like transmission members 30 having a diameter different from each other. In this case, the wiring body 20 may be made for each of the wire-like transmission members 30 having the same diameter. Accordingly, unevenness caused by a difference of a diameter of the wiring hardly occurs in a thickness direction of the wiring body 20. The plurality of wire-like transmission members 30 may include a power source line and a signal line. In this case, it is also applicable that one wiring body 20 is made up of the power source line, and the other one wiring body 20 is made up of the signal line.

Regulation Member

The regulation member 40 is attached to the wiring body 20. For example, the regulation member 40 is attached to a straight route part of the wiring body 20. For example, the regulation member 40 is a member having higher rigidity than the wiring body 20. The regulation member 40 maintains a bending state of the wiring body 20. The regulation member 40 regulates a direction of the wiring body 20. When a direction of the regulation member 40 is determined, the direction of the wiring body 20 to which the regulation member 40 is attached is determined. Specifically, the regulation member 40 includes a housing part 42 and a retaining piece 46.

The housing part 42 includes a bottom part 43 and two sidewall parts 45. The bottom part 43 and the two sidewall parts 45 are formed into a plate-like shape. The bottom part 43 or the two sidewall parts 45 may be formed into a curved plate-like shape. The two sidewall parts 45 protrude from both end portions 22 of the bottom part 43 to one surface side of the bottom part 43. Herein, the sidewall part 45 extends in a direction perpendicular to the bottom part 43. The sidewall part 45 may extend obliquely at an angle other than a right angle. For example, the two sidewall parts 45 may extend at an angle inclined from the right angle so that an interval therebetween gradually increases or decreases toward a tip end side of the sidewall parts 45. A space surrounded by the bottom part 43 and the two sidewall parts 45 constitutes a housing groove. The housing groove is opened at tip end portions of the sidewall parts 45. The wiring body 20 can be housed in the housing groove from the opening portion.

The two sidewall parts 45 are formed into the same shape. The two sidewall parts 45 may be formed into different shapes. For example, the two sidewall parts 45 may have different height dimensions from the bottom part 43. The two sidewall parts 45 extend in bilaterally symmetric directions. The two sidewall parts 45 may extend in bilaterally asymmetric directions. For example, it is also applicable that one of the two sidewall parts 45 extends to be perpendicular to the bottom part 43, and the other one thereof extends at an angle inclined from the right angle with respect to the bottom part 43.

Both end portions 22 of the wiring body 20 along the width direction are bended with respect to an intermediate portion 21. The wiring body 20 is housed in the housing part 42 while both end portions 22 thereof extend toward each tip end portion of the two sidewall parts 45.

The sheet 26 may have flexibility to be able to be bended along an inner surface of the regulation member 40 when the wiring body 20 is the bended state. It is also applicable that the sheet 26 is elastically deformed into a curved shape and stretched on an inner surface of the sidewall part 45. That is to say, force of the sheet 26 elastically restored to a flat state before being bended may be supported by the inner surface of the sidewall part 45. The sheet 26 may not be elastically deformed but may be bended. That is to say, the inner surface of the sidewall part 45 may support self-weight of the sheet 26.

The integrated end portion 24 may have flexibility to be able to be bended along the inner surface of the regulation member 40 in the wiring body 20. It is also applicable that the integrated end portion 24 is elastically deformed into a curved shape and stretched on the inner surface of the sidewall part 45 in the wiring body 20. That is to say, force of the integrated end portion 24 elastically restored to a flat state before being bended may be supported by the inner surface of the sidewall part 45. The integrated end portion 24 may not be elastically deformed but may be bended. That is to say, the inner surface of the sidewall part 45 may support self-weight of the integrated end portion 24.

The housing part 42 is formed to have a short size along the extension direction of the wiring body 20. For example, a depth dimension of the housing part 42 may be set to be equal to or smaller than a sum of a width dimension and a height dimension of the housing part 42. Herein, a depth dimension of the housing part 42 is a dimension along a direction in which the housing groove extends. For example, a depth dimension of the housing part 42 may be set to be equal to or smaller than a width dimension of the housing part 42. For example, a depth dimension of the housing part 42 may be set to be equal to or smaller than a height dimension of the housing part 42.

The housing part 42 may be formed to have a long size along the extension direction of the wiring body 20. For example, the depth dimension of the housing part 42 may be set to be larger than the width dimension of the housing part 42. For example, the depth dimension of the housing part 42 may be set to be larger than the height dimension of the housing part 42. For example, the depth dimension of the housing part 42 may be set to be larger than the sum of the width dimension and the height dimension of the housing part 42. The housing part 42 may be formed into a straight shape along the extension direction of the wiring body 20. The housing part 42 may be bended along the extension direction of the wiring body 20, or may also be branched. The housing part 42 is preferably formed into a shape in accordance with a route of the wiring body 20 to be housed therein. The housing part 42 may regulate the route of the wiring body 20.

The retaining piece 46 protrudes above the housing part 42 from each tip end portion of the two sidewall parts 45. The retaining piece 46 presses the end portion 22 of the wiring body 20. The retaining piece 46 presses the end portions 22 of the plurality of stacked wiring bodies 20. The retaining piece 46 presses the integrated end portion 24. Herein, the retaining piece 46 includes a first portion 47 and a second portion 48. The first portion 47 protrudes to a lateral side from the tip end of one sidewall part 45 toward the other sidewall part 45. Herein, the first portion 47 extends in a direction perpendicular to the sidewall part 45 and parallel to the bottom part 43. The first portion 47 may extend in a direction intersecting with the sidewall part 45 and the bottom part 43. The second portion 48 protrudes from a tip end of the first portion 47 toward the bottom part 43. Herein, the second portion 48 extends in a direction parallel to the sidewall part 45 and perpendicular to the bottom part 43. The second portion 48 may extend in a direction intersecting with the sidewall part 45 and the bottom part 43. The portion extending from the tip end portion of the sidewall part 45 toward the bottom part 43 (herein, the second portion 48) is provided in the retaining piece 46, thus a pocket is formed by the retaining piece 46 and the sidewall part 45. The end portion 22 of the wiring body 20 is housed in this pocket.

A shape of the retaining piece 46 is not limited thereto described above. For example, the retaining piece 46 may be formed into a shape in which the second portion 48 is omitted. In this case, the first portion 47 may obliquely extend from the tip end of the sidewall part 45 toward the bottom part 43. The retaining piece 46 may include a third portion protruding from the tip end of the second portion 48 toward the sidewall part 45.

Herein, one retaining piece 46 is provided in one sidewall part 45. The plurality of retaining pieces 46 may be provided in one sidewall part 45. In this case, the plurality of retaining pieces 46 are preferably provided at intervals on one sidewall part 45 along the extension direction thereof.

The retaining pieces 46 are partially provided along a depth direction of the housing part 42. A dimension of the retaining piece 46 along the depth direction of the housing part 42 is smaller than a depth dimension of the housing part 42. The regulation member 40 including the retaining piece 46 is formed by injection molding a resin material, for example. In the example illustrated in FIG. 2, a mold release hole 44 for forming the retaining piece 46 is formed in a portion of the bottom part 43 located below the retaining piece 46. Accordingly, the regulation member 40 can be manufactured by two molds divided in one direction, and manufacturing can be performed easily. In injection molding the regulation member 40, the mold release hole 44 may not be formed in the bottom part 43. It is also applicable that the regulation member 40 is not an injection molded component but an extrusion molded component in which the same cross section is continuously formed. In this case, for example, the retaining piece 46 may be provided over a whole housing part 42 in the depth direction.

Herein, the retaining piece 46 provided on one sidewall part 45 and the retaining piece 46 provided on the other sidewall part 45 have the same shape. The retaining piece 46 provided on one sidewall part 45 and the retaining piece 46 provided on the other sidewall part 45 may have different shapes.

The retaining piece 46 provided on one sidewall part 45 and the retaining piece 46 provided on the other sidewall part 45 are located in the same position along the depth direction of the housing part 42. The retaining piece 46 provided on one sidewall part 45 and the retaining piece 46 provided on the other sidewall part 45 may be located in different positions along the depth direction of the housing part 42. For example, it is also applicable that the retaining piece 46 on one sidewall part 45 and the retaining piece 46 on the other sidewall part 45 are alternately located along the depth direction of the housing part 42 in a staggered arrangement.

Herein, an area between the retaining piece 46 provided on the sidewall part 45 and the retaining piece 46 provided on the sidewall part 45 is opened. As illustrated in FIG. 4, the wiring body 20 is housed in the housing part 42 through this opening portion. A width dimension of the wiring body 20 before being housed in the housing part 42 is larger than a width dimension of the housing part 42. The width dimension of the wiring body 20 before being housed in the housing part 42 may be equal to or smaller than a sum of the width dimension of the housing part 42 and the height dimension of the housing part 42.

The wire-like transmission member 30 is provided only in the intermediate portion 21 in the intermediate portion 21 and both end portions 22 in the wiring body 20. Herein, a width dimension of a portion of the wiring body 20 provided with the wire-like transmission member 30 is smaller than a dimension of the opening portion between the two retaining pieces 46. In the wiring body 20, the width dimension of the portion of the wiring body 20 provided with the wire-like transmission member 30 may be equal to or larger than the dimension of the opening portion between the two retaining pieces 46.

Any way is applicable as a way of housing the wiring body 20 in the housing part 42. For example, the intermediate portion 21 of the wiring body 20 may be housed in the housing part 42 prior to both end portions 22. For example, the wiring body 20 may be housed in the housing part 42 in order of one end portion 22, the intermediate portion 21, and the other end portion 22. For example, both end portions 22 of the wiring body 20 may be housed in the housing part 42 prior to the intermediate portion 21. It is also applicable that the wiring body 20 has contact with a peripheral edge of the opening portion and both end portions 22 are bended at a time of passing through the opening portion.

The wiring body 20 is housed in the housing part 42 and the end portions 22 of the wiring body 20 is housed in the pocket between the retaining piece 46 and the sidewall part 45, thus the regulation member 40 is attached to the wiring body 20. The wiring member 10 is thereby made. Any method is applicable as a method of housing the end portions 22 of the wiring body 20 in the pocket between the retaining piece 46 and the sidewall part 45. For example, an operator may house the end portions 22 of the wiring body 20 located on an outer side of the pocket between the retaining piece 46 and the sidewall part 45 in the pocket between the retaining piece 46 and the sidewall part 45. The end portions 22 of the wiring body 20 may be housed in the pocket between the retaining piece 46 and the sidewall part 45 using restoring force of the wiring body 20 elastically deformed.

The end portions 22 of the wiring body 20 may have or may not have contact with the retaining piece 46 while being housed in the pocket between the retaining piece 46 and the sidewall part 45. The end portions 22 of the wiring body 20 may have or may not have contact with the first portion 47. When the end portions 22 of the wiring body 20 have contact with the first portion 47, the end portions 22 of the wiring body 20 may be bended by touching the first portion 47.

The end portions 22 of the wiring body 20 may have or may not have contact with the second portion 48. It is also applicable that a thickness of the end portions 22 of the wiring body 20 is smaller than an interval between the second portion 48 and the sidewall, thus the end portions 22 of the wiring body 20 do not have contact with the second portion 48, for example. It is also applicable that a thickness of the end portions 22 of the wiring body 20 is equal to or larger than an interval between the second portion 48 and the sidewall, thus the end portions 22 of the wiring body 20 have contact with the second portion 48, for example. It is also applicable that a thickness of the end portions 22 of the wiring body 20 is larger than an interval between the second portion 48 and the sidewall, thus the end portions 22 of the wiring body 20 are sandwiched and held by the second portion 48 and the sidewall part 45, for example. In this case, at least one of the end portions 22 of the wiring body 20 or the regulation member 40 is preferably elastically deformed. For example, a portion of the end portions 22 of the wiring body 20 sandwiched and held by the second portion 48 and the sidewall part 45 may be elastically deformed so that a thickness dimension thereof is smaller than that of a surrounding portion thereof. For example, the regulation member 40 may be elastically deformed so that an interval between the second portion 48 and the sidewall part 45 increases.

The end portions 22 of the wiring body 20 is pressed by the retaining piece 46, thus the wiring body 20 and the regulation member 40 are positioned in a height direction and a width direction of the wiring body 20. The wiring body 20 and the regulation member 40 may be positioned along the extension direction of the wiring body 20. The wiring body 20 and the regulation member 40 may be positioned by a positioning member provided separately from the wiring body 20 and the regulation member 40. Any member is applicable as the positioning member, and a single-sided adhesive tape, a double-sided adhesive tape, or an adhesive agent, for example, is also applicable.

The wiring body 20 and the regulation member 40 may be positioned without using the other positioning member. The wiring body 20 and the regulation member 40 may have a positioning structure. Any structure is applicable as the positioning structure. For example, the end portions 22 of the wiring body 20 may be pressed into the pocket between the retaining piece 46 and the sidewall part 45. In this case, the wiring body 20 and the regulation member 40 are positioned by force such as frictional force acting between the wiring body 20 and the regulation member 40. For example, it is applicable that the retaining piece 46 includes the third portion protruding from the tip end of the second portion 48 toward the sidewall part 45, and a hole into which the third portion is fitted is formed in the end portion 22 of the wiring body 20. In this case, the third portion is fitted into the hole, thus the wiring body 20 and the regulation member 40 are positioned. For example, applicable as the positioning structure is that a concave portion concaved toward a side of the other end portion 22 is formed in one end portion 22 of the wiring body 20. In this case, the first portion 47 is fitted into the concave portion and an edge portion adjacent to the concave portion protrudes above the first portion 47, thus the wiring body 20 and the regulation member 40 are positioned.

Effect etc. of Embodiment 1

According to the wiring members 10 and 110 having the above configurations, the wiring body 20 is housed in the housing part 42 while both end portions 22 along the width direction are bended with respect to the intermediate portion 21 and extend toward the tip end portion of each of the two sidewall parts 45, and the retaining piece 46 protrudes above the housing part 42 from the tip end portion of each of the two sidewall parts 45 to press the end portion 22 of the wiring body 20. Accordingly, the end portion 22 is housed in the housing part 42 while the wiring body 20 is bended to be locked to the retaining piece 46, thus the regulation member 40 is simply attached to the wiring body 20.

The wire-like transmission member 30 is provided only in the intermediate portion 21 in the intermediate portion 21 and both end portions 22 in the wiring body 20 along the width direction. Accordingly, bending of the wire-like transmission member 30 is suppressed.

The retaining piece 46 presses the end portions 22 of the plurality of stacked wiring bodies 20. Accordingly, the regulation member 40 is simply attached to the laminated body of the plurality of wiring bodies 20.

Provided are the integrated end portions 24 and 124 in which the end portions 22 of the plurality of stacked wiring bodies 20 are integrated with each other. The end portions 22 of the plurality of stacked wiring bodies 20 constitute the integrated end portions 24 and 124, thus rigidity of the integrated end portions 24 and 124 is increased even when rigidity of the end portions 22 of the wiring bodies 20 is low. The retaining piece 46 presses the integrated end portions 24 and 124, thus the state where the end portions 22 of the wiring bodies 20 are pressed by the retaining piece 46 is hardly resolved.

The wire-like transmission member 30 includes the covering layer 34. Accordingly, the regulation member 40 is simply attached to the wiring body 20 in which the wire-like transmission member 30 provided with the covering layer 34 is fixed to the sheet 26.

Modification Example

Figure 6:
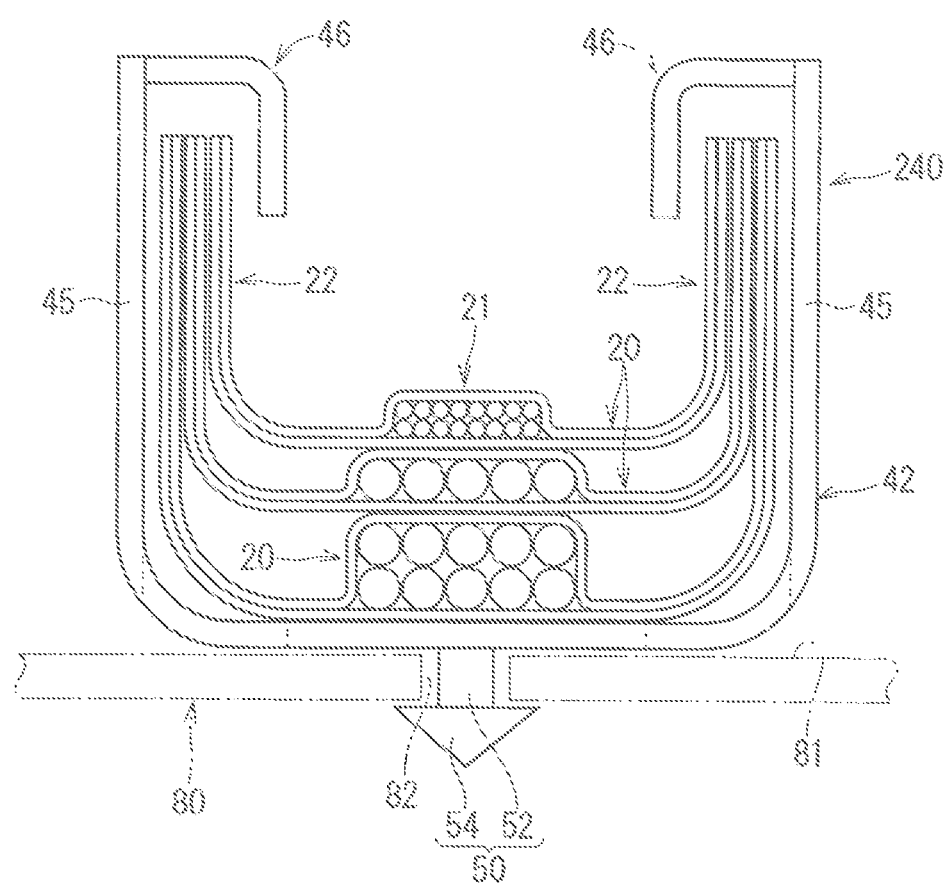
FIG. 6 is a front view illustrating a modification example of the regulation member.

FIG. 6 is a front view illustrating a modification example of the regulation member 40.

A regulation member 240 according to the modification example is different from the regulation member 40 described above in that the regulation member 240 further includes a fixing part 50 fixed to a routing target 80 of the wiring body 20. The regulation member 240 includes the fixing part 50, thus the regulation member 240 can double as a fixing member fixing the wiring body 20 to the routing target 80. A direction of the regulation member 240 is easily maintained in a predetermined direction while the fixing part 50 is fixed to the routing target 80.

In the example illustrated in FIG. 6, the fixing part 50 is a clamp. The fixing part 50 includes a columnar part 52 and a locking piece 54. The columnar part 52 protrudes from an outer surface of the housing part 42 to an outer side. Herein, the columnar part 52 protrudes from an outer surface of the bottom part 43 to an outer side. The locking piece 54 is provided on a tip of the columnar part 52. The locking piece 54 is formed into a shape gradually spreading outward toward a base end of the columnar part 52. The fixing part 50 is locked to an attachment hole 82 formed in a routing surface 81 of the routing target 80. When the locking piece 54 is inserted into the attachment hole 82, the locking piece 54 can be elastically deformed so that a width dimension of a tip end portion is reduced. The locking piece 54 is elastically restored after passing through the attachment hole 82, and is locked to a peripheral edge portion of the attachment hole 82 in a rear surface of the routing surface 81.

The fixing part 50 as the clamp is integrally molded with the housing part 42. The clamp may be formed separately from the housing part 42. The clamp may be a cassette clamp, for example. In this case, an attachment part capable of attaching the cassette clamp to the housing part 42 is preferably formed.

The fixing part 50 may not be the clamp. For example, the fixing part 50 may be a screwing part in which a screw hole through which a screw passes is formed.

Figure 7:
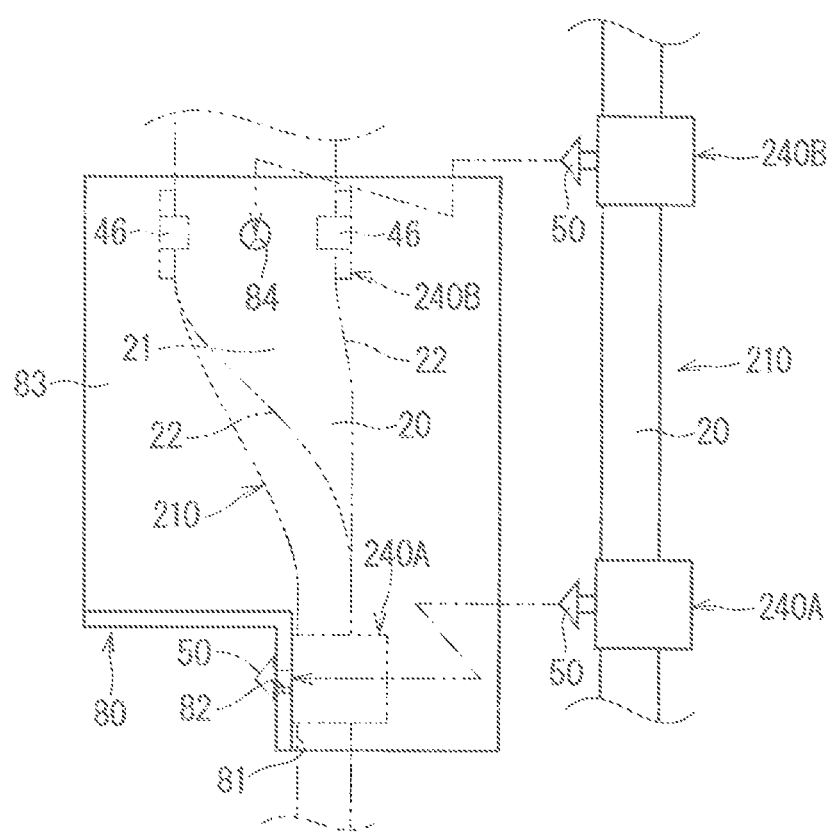
FIG. 7 is an explanation diagram illustrating the wiring member routed on a routing target.

FIG. 7 is an explanation diagram illustrating a wiring member 210 routed on the routing target 80. In the description herein, the wiring member 210 includes the regulation member 240, however, the wiring member 210 may include the regulation member 40.

The routing target 80 includes two routing surfaces 81 and 83. The two routing surfaces 81 and 83 intersect with (herein, perpendicular to) each other. The routing surface 81 is a surface directed to a right-left direction of a plane of paper in FIG. 7, and extending in an up-down direction of the plane of paper and a direction perpendicular to the plane of paper. The routing surface 83 is a surface directed to a direction perpendicular to the plane of paper in FIG. 7, and extending in parallel to the plane of paper. The attachment hole 82 is formed in the routing surface 81. The attachment hole 84 is formed in the routing surface 83.

FIG. 7 illustrates the wiring member 210 before being routed on the routing target 80 by a solid line. FIG. 7 illustrates the wiring member 210 after being routed on the routing target 80 by an alternate long and two short dashes line. In the wiring member 210 illustrated by the solid line, a right-left direction of a plane of paper is a height direction of the wiring member 210. In the wiring member 210 illustrated by the alternate long and two short dashes line, a portion where the regulation member 240A is provided in the two regulation members 240A and 240B is routed on the routing surface 81 in the same direction as the wiring member 210 illustrated by the solid line. At this time, the fixing part 50 of the regulation member 240A is inserted into the attachment hole 82 and locked thereto. In the wiring member 210 illustrated by the alternate long and two short dashes line, a portion where the regulation member 240B is provided is routed on the routing surface 83 in a direction different from the wiring member 210 illustrated by the solid line. The portion where the regulation member 240B is provided is routed so that the direction perpendicular to the plane of paper is the height direction of the wiring member 210. At this time, the fixing part 50 of the regulation member 240B is inserted into the attachment hole 84 are locked thereto.

In this manner, the wiring member 210 may be routed on the routing target 80 so that the two regulation members 240A and 240B are directed to the different directions. In this case, a portion of the wiring member 210 between the two regulation members 240A and 240B can gradually change its direction from a direction regulated by the regulation member 240A in a position of the regulation member 240A (the direction in which the right-left direction in the plane of paper in FIG. 7 is the height direction) toward a direction regulated by the regulation member 240B in a position of the regulation member 240B (the direction in which the direction perpendicular to the plane of paper in FIG. 7 is the height direction).

In addition, in the above description, the sheet 26 and the wire-like transmission member 30 are fused, however, this configuration is not necessary. Any fixing state may be applied as a fixing state of fixing the sheet 26 and the wire-like transmission member 30. For example, the sheet 26 and the wire-like transmission member 30 may be bonded via an adhesive member such as an adhesive agent or a double-sided adhesive tape. The sheet 26 and the wire-like transmission member 30 may be sewn to each other by a sewing thread, for example. The wire-like transmission member 30 may be sandwiched by the sheet 26 and the cover 36 and fixed.

For example, the wiring body 20 may be a flexible flat cable (FFC) or flexible print circuits (FPC). When the wiring body 20 is an FFC or FPC, the wire-like transmission member 30 may not include the covering layer 34. For example, when the wiring body 20 is an FFC, the wire-like transmission member 30 may be a bare conductor such as a rectangular conductor. In this case, the sheet 26 is a film-like member. For example, when the wiring body 20 is an FPC, the wire-like transmission member 30 may be a conductor pattern printed on the sheet 26. In this case, the sheet 26 is a member of a flexible substrate.

In the above description, the wire-like transmission member 30 is provided only in the intermediate portion 21 in the intermediate portion 21 and both end portions 22 in the wiring body 20, however, this configuration is not necessary. The wire-like transmission member 30 may be provided in the end portion 22 in the wiring body 20.

In the above description, the plurality of wiring bodies 20 flatly formed are stacked in the wiring members 10, 110, and 210, however, this configuration is not necessary. The wiring bodies 20 may not be stacked.

The configurations described in the embodiments and modification examples thereof can be appropriately combined as long as they are not contradictory.

EXPLANATION OF REFERENCE SIGNS 10, 110, 210 wiring member
20, 20A, 20B, 20C, 20D, 20E wiring body
21 intermediate portion
22 end portion
24, 124 integrated end portion
26 sheet
30 wire-like transmission member
32 transmission wire body
34 covering layer
36 cover
40, 240, 240A, 240B regulation member
42 housing part
43 bottom part
44 mold release hole
45 sidewall part
46 retaining piece
47 first portion
48 second portion
50 fixing part
52 columnar part
54 locking piece
80 routing target
81, 83 routing surface
82, 84 attachment hole
C connector

The invention claimed is:

1. A wiring member, comprising:
at least one wiring body including a sheet and a wire-like transmission member fixed to the sheet; and
a regulation member including a housing part and a retaining piece and attached to the wiring body, wherein
the housing part includes a bottom part and two sidewall parts protruding from the bottom part,
the wiring body is housed in the housing part while both end portions along a width direction are bent with respect to an intermediate portion and extend toward a tip end portion of each of the two sidewall parts, and
the retaining piece protrudes above the housing part from the tip end portion of each of the two sidewall parts to press the end portions of the wiring body.

2. The wiring member according to claim 1, wherein
in the wiring body, the wire-like transmission member is provided only in the intermediate portion in the intermediate portion and the both end portions in the wiring body.

3. The wiring member according to claim 1, wherein
the plurality of wiring bodies flatly formed are stacked, and
the end portions of the plurality of stacked wiring bodies are pressed by the retaining piece.

4. The wiring member according to claim 3, wherein
an integrated end portion in which the end portions of the plurality of stacked wiring bodies are integrated is provided, and
the retaining piece presses the integrated end portion.

5. The wiring member according to claim 1, wherein
the wire-like transmission member includes a transmission wire body and a covering layer covering the transmission wire body.

6. The wiring member according to claim 1, wherein
the regulation member further includes a fixing part fixed to a routing target of the wiring body.

* * * * *